April 15, 1952     D. B. DRISKILL     2,592,873
APPARATUS FOR LANDING ROCKETS AND ROCKET SHIPS
Filed Jan. 16, 1950     2 SHEETS—SHEET 1
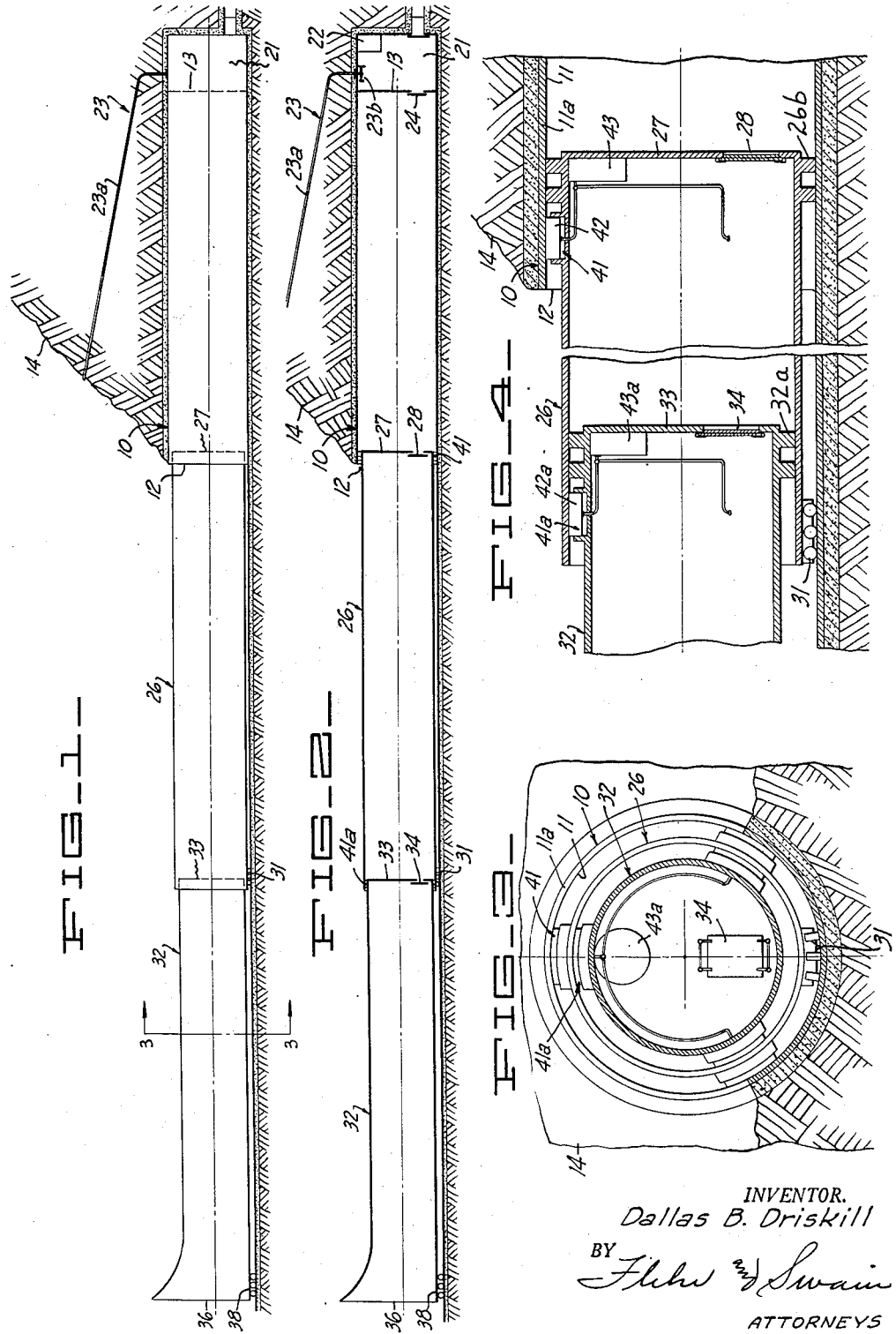
INVENTOR.
*Dallas B. Driskill*
BY
ATTORNEYS April 15, 1952   D. B. DRISKILL   2,592,873
APPARATUS FOR LANDING ROCKETS AND ROCKET SHIPS
Filed Jan. 16, 1950   2 SHEETS—SHEET 2
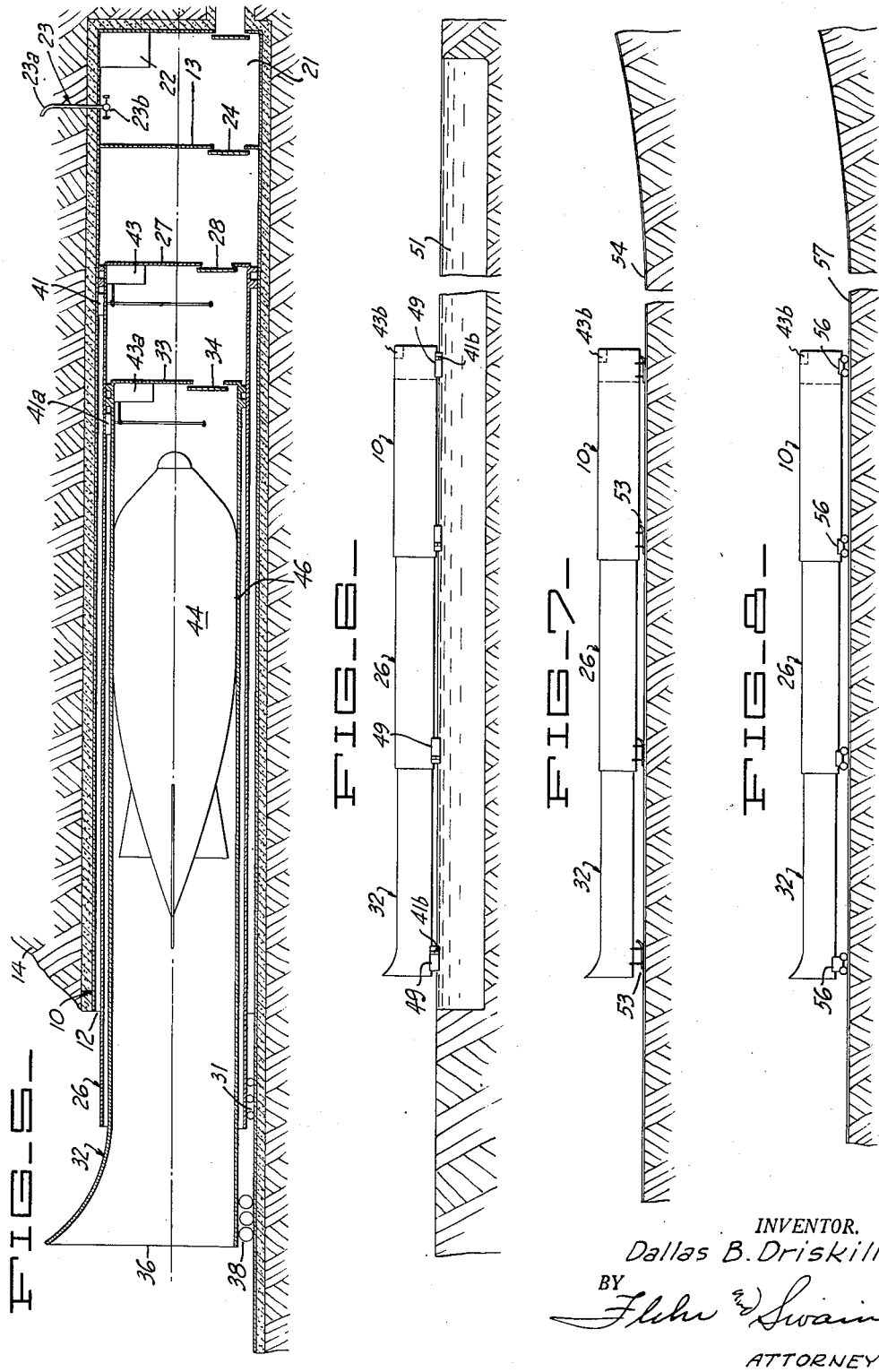
INVENTOR.
Dallas B. Driskill
BY
ATTORNEYS Patented Apr. 15, 1952

2,592,873

UNITED STATES PATENT OFFICE 2,592,873

APPARATUS FOR LANDING ROCKETS AND ROCKET SHIPS

Dallas B. Driskill, San Francisco, Calif.

Application January 16, 1950, Serial No. 138,857

10 Claims. (Cl. 244—110)

This invention relates to passenger carrying rocketships and particularly to apparatus for safely landing the same.

Rocketships and rocket driven devices are adapted to travel at a very high altitude and at a very high rate of speed. Consequently the landing of such devices presents numerous problems which, to the best of my knowledge, have not yet been overcome. For example, it has been suggested that parachute releasing devices be utilized when the rocket nears the end of its voyage. Needless to say, such devices would be bulky and would require considerable extra apparatus for their use. Various other deceleration devices have been suggested for use in the landing of such rocketships including, for example, spoilers which would increase the frictional resistance of the device in air, thereby tending to slow the same down; wings which might be extended from the craft to increase its maneuverability, jets and other thrust producing apparatus which are directed generally forwardly of the ship to retard its advance; etc.

However, utilization of any of these devices involves either the use of considerable bulky apparatus which is impractical in use in rocketships, since the same depend for their efficiency upon the maximum pay load and the minimum dead load, or the use of dangerous or difficult to operate devices and apparatus.

Since the effective utilization of rocket principles depends upon the utmost lightness of the device itself, with the removal of all excess apparatus, it is obvious that the most effective landing apparatus will be found entirely independent of the rocketship and at the point where the device is to be landed.

To this end, therefore, I have provided a rocket landing structure which is entirely independent of the rocketship and which may be utilized with any rocketship or other aerial vehicle.

It is an object of this invention to provide means for safely landing passenger laden rockets and self-propelled devices of this character whereby the passengers or mail or other articles carried thereby will not be destroyed or will not risk destruction in landing.

Other objects and advantages of this invention will appear from the following specification taken in conjunction with the accompanying drawings in which:

Figure 1 is a side elevational view of a rocket landing device incorporating my invention;

Figure 2 is a cross-sectional view of the device illustrated in Figure 1;

Figure 3 is a cross-sectional view taken along the line 3—3 of Figure 1;

Figure 4 is an enlarged fragmentary cross-sectional detail of the device illustrated in Figure 2;

Figure 5 is a cross-sectional view of the device as shown in Figure 2 after the rocket has been received therein;

Figure 6 is a modification of the device shown in Figure 1 in which the apparatus is provided with floats and is adapted to be floated in an artificial lake;

Figure 7 is a further modification showing the device mounted upon skids; and

Figure 8 is a further modification showing the device mounted upon railroad cars and tracks.

As illustrated in Figures 1, 2 and 4, I have provided a landing tube 10 which is provided with an inner bore 11, an open end 12 and a closed end wall 13. The tube 10 is adapted, as illustrated in Figures 1, 6, 7 and 8, to be mounted in a number of ways, for example, in a mountainside, as shown in Figure 1; in an artificial lake, as shown in Figure 6; on skids, as shown in Figure 7; or on tracks as shown in Figure 8.

The particular construction of the tube 10, in order that the same may be mounted in any of the several manners above indicated, will further hereinafter be explained in connection with each specific modification.

As illustrated in Figure 1, the tube 10, which is adapted to be housed in the earth as, for example, in a mountainside 14, may be formed of any suitable material such as reinforced concrete. However, the bore 11 is provided with suitable heat resistant smooth metal liner 11a. The bore 11 may be of any desired shape, and, as shown in Figure 3 is generally circular but may, if desired, be of any suitable shape to conform to particular requirements.

Beyond the closed end 13 of the stationary tube 10, I have provided a chamber 21 which contains suitable compressor equipment 22 and a suitable venting system 23, composed of piping and valves 23a and 23b. A lock 24 is provided in the wall 13 to permit passage from within the tube 10 to the chamber 21. Lock 24 may be manually or mechanically operated. Coaxially aligned with the tube 10 and telescopically mounted with respect thereto is a tube 26. The closed end 27 extends a short distance into the bore 11 of tube 10 to insure proper alignment and operation. The closed end 27 of tube 26 is provided with a suitable lock 28 which provides communication between the interior of tube 26 and tube 10. The outer walls of the tube 26 are of very nearly the same section as the inner walls of the tube 10, providing a close fit between the outer wall of the tube 26 and the inner wall of the tube 10, whereby the tube 26 may reciprocate within the tube 10. The tube 26 in effect forms a piston within the cylinder 10 and their fit is sufficently close that the passage of fluid between the two members is prevented or, at least, retarded. While the members may very nearly be in engagement I believe that the problem of providing such closely machined parts will be too great, and I prefer that the walls 26a and the bore 11 be manufactured with substantially different diameters. In this event, an annular ring 26b, or a group of annular rings 26b may be provided on the tube 26. These rings 26b fit closely against the bore 11 and prevent or retard the passage of air between the walls of tube 26 and bore 11. If this type of construction is utilized, the tube 26 may be provided with supporting apparatus consisting of skids or wheels 31 to support the tube 26 with respect to the tube 10.

A third tubular member 32 is telescopically mounted in the open end of the tube 26 and is coaxially aligned therewith. The outer wall of the tube 32 is provided with rings 32a which fit closely against the inner wall of the tube 26 to prevent or retard the passage of air therebetween. The closed end 33 of the tube 32 is provided with a lock 34. The tube 32 is provided with supporting apparatus consisting of skids or wheels 38 which engage the surface of the surrounding area whereby the tube 32 will be supported with respect thereto.

Adjacent the closed ends of the tubes 26 and 32 there are provided suitable brake devices 41 and 41a, respectively, which are identical in construction and, therefore, may be described simultaneously. Brakes 41 and 41a consist of two sets of three shoes 42 and 42a which, in retracted position, are flush with and do not extend beyond the outer wall of the tubes 26 and 32 upon which they are mounted. However, the shoes 42 and 42a are adapted to be urged radially outwardly and engage the inner walls of the tubes 26 and 10 respectively, to retain them in position and to lock the tubes 32 and 26 in the position shown in Figures 1, 2 and 4. Brakes 42 and 42a are actuated by pressure responsive members 43 and 43a whereby, when the pressure within one of the tubes exceeds a predetermined pressure, the brake shoes 42 or 42a on that tube are retracted and that tube may then be moved longitudinally with respect to the next tube. Specifically, as the pressure within the tube 26, for example, increases to a predetermined point, the pressure responsive means 43 within the tube 26 is operated to retract the brake shoes 42 whereby the tube 26 may move longitudinally with respect to the tube 10.

It will be obvious that in order to utilize this mechanism in the landing of a rocket 44, it will be necessary to guide the rocket 44 with considerable accuracy toward the open end 36 of the member 32. This may be done by radio beam, remote radio control, or any other usual control device which is well known in the art and which need not be further described herein inasmuch as the same does not constitute a part of the invention. However, at the time the rocket enters the open end 36 of the member 32, it must be coaxially aligned with the tubes 32 and 26 and 10. Needless to say, the outer wall 46 of the rocket 44 is of only slightly less diameter than the inner wall of the tube 32, whereby the passage of fluid between the rocket 44 and tube 32 is prevented or retarded.

Operation of the device may briefly be described as follows: Let it be assumed that the device is in the position illustrated in Figures 1, 2 and 3. The locks 34, 28 and 24 are closed to prevent the passage of fluid from adjoining tubes. The pressure responsive devices 43 and 43a are set to operate at a predetermined pressure and the brakes 41 and 41a are set, thereby locking the entire assembly in the position shown in Figures 1, 2 and 3. For example, the pressure responsive device 43a within the tube 32 may be set to retract the brakes 41a when the pressure within the tube 32 exceeds, for example 400 pounds per square inch. The pressure responsive apparatus 43 in the tube 26 may be set to retract the brakes 41 when the pressure within the tube 26 reaches or exceeds, for example, 800 pounds per square inch.

As the rocket 44 enters the open end 36 of the tube 32, it will be appreciated that it is moving at a terrific rate of speed. The tube 32 is of considerable length, and as the rocket 44 begins its progress toward the closed end 33 of the tube 32, the pressure within the closed end of the tube increases, since the passage of fluid from within the tube 32 between it and the rocket 44 is prevented or seriously retarded. However, when the pressure within the closed end of the tube 32 exceeds the predetermined pressure for which the pressure responsive apparatus 43a has been set to operate, the brakes 41a are retracted and the entire tube 32 and the rocket 44 which it contains may advance forwardly within the tube 26. The pressure within the closed end of the tube 26 will likewise be increased until it equals the setting of the pressure responsive apparatus 43. The brakes 41 of the tube 26 will then be retracted permitting the rocket 44, tube 32 and tube 26 to advance into the tube 10. The pressure within the tube 10 likewise increases as the tube 26 advances therein, thereby cushioning and absorbing the shock of the landing. As the rocket is decelerated in this manner, sudden or unexpected jars or shocks are eliminated.

When the rocket is stopped, the venting mechanism 23 may discharge the fluid compressed in the tube 10. The locks 28 and 34 may be opened and the compressed fluid within the tubes 26 and 32 may be vented therethrough and through the venting system 23. When the system has been entirely vented and the air within the entire apparatus is at atmospheric pressure, the passengers of the rocket may be discharged through the forward end thereof. They may then pass through the locks 34, 28 and 24 into the chamber 21, from which a suitable exit may be provided.

The rocket may be removed from the tube 32 in any suitable manner, obviously, through the open end 36.

The locks 34, 28 and 24 are then sealed in closed position. By means of the compression apparatus 22 in the chamber 21, the pressure within the tube 10 is increased, urging the tube 26 longitudinally and expelling the same generally until it reaches the position approximated in Figures 1, 2 and 3. The brake mechanism 41 of the tube 26 is then set whereby further longitudinal movement of the tube 26 with respect to the tube 10 is prevented. The pressure may then be introduced into the tube 26 as, for example, by opening the lock 28, in order that the tube 32 may be expelled or moved longitudinally until it has been discharged to a predetermined point at which time brakes 41a are set preventing its further outward movement. The entire system is then evacuated and returned to atmospheric pressure.

Modifications of the invention are disclosed in Figures 6, 7 and 8. In Figure 6, for example, the construction is substantially the same as illustrated in connection with Figure 1, with the exception, however, that the tube 10 is mounted upon suitable floats 49 in an artificial lake 51. The purpose of so mounting the device is to provide further shock absorbing means. It is obvious that as the pressure within the tube 10 increases, further shock absorbing means might be desirable if the total length of the three tubes 10, 26 and 32 is insufficient for the purpose intended. In that event the tube 10 is provided with pressure responsive apparatus 43b, similar to that which has previously been described in connection with the tubes 26 and 32 and with brakes 41b, similar to the brakes 41 and 41a upon the devices 26 and 32. Brakes 41b engage the side walls of the artificial lake 51 and when the pressure within the tube 10 exceeds the predetermined setting of the pressure responsive apparatus 43b, the brakes 41b are released and the tube 10, upon its floats 49, and the entire assembly consisting of the rocket 44, the tube 32, the tube 26 and the tube 10 and its accommodating floats 49 may then go forward along the course of the artificial lake 51. Suitable means such as screw propellers, etc. may be utilized in connection with the apparatus 49 to either direct the apparatus 49 or to slow the same down.

A further modification is illustrated in Figure 7 in which the tube 10 is mounted upon skids 53, which, in turn, are mounted upon a suitable base or track 54. The apparatus is adapted to go forward and ultimately come to a stop upon the track 54. The end of the track 54 may be slanted upward, for example, to aid in halting the device.

In the modification shown in Figure 8, the tube 10 is mounted upon a railroad car assembly 56 which, in turn, is mounted upon suitable railroad tracks 57. The railroad cars 56 are adapted to have their wheels locked to prevent forward motion of the same until a considerable portion of the forward momentum of the rocket and its energy have been absorbed by apparatus consisting of the tubes 32, 26 and 10. However, the brakes are adapted to be released upon the pressure within the tube 10 exceeding a predetermined limit at which time the railroad cars 56 are free to advance along the tracks 57. As is the case in connection with the track 54 upon which the device illustrated in Figure 7 may be operated, the tracks 57 may be laid up a slight incline to aid in slowing the entire assembly down and ultimately bringing it to a halt.

I claim:

1. In a device for receiving rockets and rocket ships, a primary tubular member having substantially parallel inner side walls and having one closed end and one open end, a pair of secondary tubular members coaxially aligned with said primary member, each of said secondary members having one open end and one closed end, the first of said secondary members having its closed end adjacent the open end of said primary member and the second of said secondary members having its closed end adjacent the open end of said first secondary member when the device is in rocket receiving position.

2. In a device of the character described, a primary tubular member having substantially parallel inner side walls and having one closed end and one open end, a pair of secondary tubular members coaxially aligned with said primary member, each of said secondary members having one open end and one closed end, the first of said secondary members having its closed end adjacent the open end of said primary member and the second of said secondary members having its closed end adjacent the open end of said first secondary member when the device is in rocket receiving position, said second secondary member being adapted to be urged inwardly into said first secondary member and said first secondary member being adapted to be urged into said primary member.

3. In a device for receiving rockets and rocket ships, a primary tubular member having substantially parallel inner side walls and having one closed end and one open end, a pair of secondary tubular members coaxially aligned with said primary member, each of said secondary members having one open end and one closed end, the first of said secondary members having its closed end adjacent the open end of said primary member and the second of said secondary members having its closed end adjacent the open end of said first secondary member when the device is in rocket receiving position, said secondary member being adapted to be urged inwardly into said first secondary member and said first secondary member being adapted to be urged into said primary member, the outer walls of each of said secondary members being provided with means engaging the inner walls of the member into which it may be urged to prevent the passage of fluid between said secondary tubular members when each of said tubular members are urged into the said other members.

4. In a device for receiving rockets and rocket ships, a primary tubular member having substantially parallel inner side walls and having one closed end and one open end, a pair of secondary tubular members coaxially aligned with said primary member, each of said secondary members having one open end and one closed end, the first of said secondary members having its closed end adjacent the open end of said primary member and the second of said secondary members having its closed end adjacent the open end of said first secondary member when the device is in rocket receiving position, said secondary member being adapted to be urged inwardly into said first secondary member and said first secondary member being adapted to be urged into said primary member, brake means on the outer walls of said secondary members adapted to engage or disengage the inner walls of the members into which each of said secondary members is adapted to be urged.

5. In a device for receiving rockets and rocket ships, a primary tubular member having substantially parallel inner side walls and having one closed end and one open end, a pair of secondary tubular members coaxially aligned with said primary member, each of said secondary members having one open end and one closed end, the first of said secondary members having its closed end adjacent the open end of said primary member and the second of said secondary members having its closed end adjacent the open end of said first secondary member when the device is in rocket receiving position, said secondary member being adapted to be urged inwardly into said first secondary member and said first secondary member being adapted to be urged into said primary member, brake means on the outer walls of said secondary members adapted to engage or disengage the inner walls of the members into which each of said secondary members is adapted to be urged and pressure responsive means responsive on each of said members responsive to the fluid pressure within each of said members, said pressure responsive means causing the operation of said brake means.

6. In a device for receiving rockets and rocket ships, a primary tubular member having substantially parallel inner side walls and having one closed end and one open end, a pair of secondary tubular members coaxially aligned with said primary member, each of said secondary members having one open end and one closed end, the first of said secondary members having its closed end adjacent the open end of said primary member and the second of said secondary members having its closed end adjacent the open end of said first secondary member when the device is in rocket receiving position, said secondary member being adapted to be urged inwardly into said first secondary member and said first secondary member being adapted to be urged into said primary member, brake means on the outer walls of said secondary members adapted to engage or disengage the inner walls of the members into which each of said secondary members is adapted to be urged, the outer walls of each of said secondary members being provided with means for engaging the inner walls of the member into which it may be urged to prevent the passage of fluid between said secondary tubular members when each of said tubular members are urged into the said other members.

7. In a device for receiving rockets and rocket ships, a primary tubular member having substantially parallel inner side walls and having one closed end and one open end, a pair of secondary tubular members coaxially aligned with said primary member, each of said secondary members having one open end and one closed end, the first of said secondary members having its closed end adjacent the open end of said primary member and the second of said secondary members having its closed end adjacent the open end of said first secondary member when the device is in rocket receiving position, said secondary member being adapted to be urged inwardly into said first secondary member and said first secondary member being adapted to be urged into said primary member, brake means on the outer walls of said secondary members adapted to engage or disengage the inner walls of the members into which each of said secondary members is adapted to be urged and pressure responsive means responsive on each of said members responsive to the fluid pressure within each of said members, said pressure responsive means causing the operation of said brake means, the outer walls of each of said secondary members being provided with means engaging the inner walls of the member into which it may be urged to prevent the passage of fluid between said secondary tubular members when each of said tubular members are urged into the said other members.

8. Landing apparatus for rocket craft comprising a landing tube adapted to receive a rocket craft, said tube having a substantially cylindrical form and a closed inner end, a plurality of cylindrical members each having a closed inner end coaxially aligned in telescoping fashion with said tube and each other, means for movably interfitting said members, and means for utilizing the air pressure developed within said members by the movement of a rocket craft within said tube and said members to rapidly decelerate the rocket craft.

9. Landing apparatus for rocket craft comprising a landing tube having a cylindrical form, one end of said tube being adapted to permit entry of a rocket craft, the other end of said tube being closed, a plurality of coaxially aligned telescoping cylindrical sections, each of said sections having a closed end, the smaller of said sections being adapted to movably accommodate and carry said tube, individual brake means for holding said tube and said sections in longitudinally extended position with respect to each other, and means for releasing each of said brake means to permit telescoping of said tube and said sections, said last named means including devices responsive to high fluid pressures.

10. In landing apparatus for rocket craft, a plurality of telescoping cylindrical members, the first of said members being adapted to receive a rocket craft, each of said members having a closed inner end, that member which is the largest in diameter being fixedly mounted in relation to the surface of the earth, each of said other members being movably mounted in relation to said last named member, individual brake means carried by each member to hold it in longitudinally extended position relative to its next larger adjacent member, high pressure responsive means carried by each member to release said brake means to permit that member to move longitudinally within its next larger adjacent member to cause a telescoping effect, said member being so formed that the movement of the rocket and of those members smaller in diameter therethrough will create a relatively high air pressure due to the velocity of the moving members sufficient to operate said high pressure responsive means.

DALLAS B. DRISKILL.

REFERENCES CITED

The following references are of record in the file of this patent:

UNITED STATES PATENTS

| Number | Name | Date |
|---|---|---|
| 1,395,612 | Stewart | Nov. 1, 1921 |
| 1,631,369 | Gartin | June 7, 1927 |
| 1,780,659 | Wallace | Nov. 4, 1930 |
| 2,066,776 | Geddes | Jan. 5, 1937 |
| 2,246,716 | Bottrill | June 24, 1941 |
| 2,395,405 | Goddard | Feb. 26, 1946 |